United States Patent
Kia et al.

(10) Patent No.: US 10,427,349 B2
(45) Date of Patent: Oct. 1, 2019

(54) COMPONENTS MOLDED WITH MOLDABLE CARBON FIBER AND METHODS OF MANUFACTURING THEREOF

(71) Applicant: GM Global Technology Operations LLC, Detroit, MI (US)

(72) Inventors: Hamid G. Kia, Bloomfield Hills, MI (US); Selina X. Zhao, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 213 days.

(21) Appl. No.: 15/274,280

(22) Filed: Sep. 23, 2016

(65) Prior Publication Data

US 2018/0085991 A1  Mar. 29, 2018

(51) Int. Cl.
*B29B 11/14* (2006.01)
*D01F 9/145* (2006.01)
(Continued)

(52) U.S. Cl.
CPC .......... *B29C 49/0047* (2013.01); *B29B 11/14* (2013.01); *B29C 49/0005* (2013.01); *B29C 49/58* (2013.01); *D01F 9/145* (2013.01); *D01F 9/22* (2013.01); *B29B 11/12* (2013.01); *B29B 2911/1408* (2013.01); *B29B 2911/14053* (2013.01); *B29B 2911/14506* (2013.01);
(Continued)

(58) Field of Classification Search
CPC ....... D01F 9/22; D01F 9/145; D10B 2101/12; B32B 2262/106; B29C 49/0047; B29C 49/0005; B29K 2105/08

USPC ................................. 428/36.4; 442/179, 181
See application file for complete search history.

(56) References Cited

U.S. PATENT DOCUMENTS

| 3,458,615 A | 7/1969 | Bragaw, Jr. et al. |
| 3,699,210 A | 10/1972 | Binning et al. |

(Continued)

FOREIGN PATENT DOCUMENTS

| CN | 101600550 A | 12/2009 |
| CN | 102965928 A | 3/2013 |

(Continued)

OTHER PUBLICATIONS ("Hollow." Merriam Webster, www.merriam-webster.com/dictionary/hollow.2018.) (Year: 2018).*

(Continued)

*Primary Examiner* — Lee E Sanderson
*Assistant Examiner* — Michael C Romanowski
(74) *Attorney, Agent, or Firm* — Harness, Dickey & Pierce, P.L.C.

(57) ABSTRACT

In various aspects, the present disclosure provides a structural component. The structural component includes a body defining at least one hollow region. The body includes a carbon fiber composite including a plurality of substantially aligned continuous carbon fibers. The plurality of substantially aligned carbon fibers defines a major axis and a second axis perpendicular to the major axis. The plurality of substantially aligned continuous carbon fibers includes a plurality of discrete termination points staggered with respect to the second axis. Methods of making such structural components, including by blow molding and compression molding are also provided.

20 Claims, 6 Drawing Sheets

(51) Int. Cl.

| | | |
|---|---|---|
| *B29B 11/12* | (2006.01) | |
| *B29C 43/52* | (2006.01) | |
| *B29C 49/00* | (2006.01) | |
| *D01F 9/22* | (2006.01) | |
| *B29C 49/58* | (2006.01) | |
| *B29K 507/04* | (2006.01) | |
| *B29L 31/00* | (2006.01) | |
| *B29C 49/46* | (2006.01) | |
| *B29K 105/08* | (2006.01) | |
| *B29K 105/12* | (2006.01) | |
| *B29C 43/02* | (2006.01) | |
| *B29C 49/22* | (2006.01) | |
| *B29C 49/02* | (2006.01) | |

(52) U.S. Cl.
CPC .............. *B29C 43/02* (2013.01); *B29C 43/52* (2013.01); *B29C 49/22* (2013.01); *B29C 2049/028* (2013.01); *B29C 2049/4655* (2013.01); *B29C 2049/4658* (2013.01); *B29C 2049/5803* (2013.01); *B29K 2105/08* (2013.01); *B29K 2105/12* (2013.01); *B29K 2507/04* (2013.01); *B29L 2031/7158* (2013.01); *D10B 2505/02* (2013.01)

(56) References Cited

U.S. PATENT DOCUMENTS

| | | | |
|---|---|---|---|
| 4,208,267 A * | 6/1980 | Diefendorf | ............... C10C 3/00 208/22 |
| 5,017,423 A | 5/1991 | Bossmann et al. | |
| 5,024,818 A | 6/1991 | Tibbetts et al. | |
| 5,582,912 A | 12/1996 | McCullough, Jr. et al. | |
| 5,916,346 A | 6/1999 | Neal | |
| 6,638,883 B2 | 10/2003 | Gaffney et al. | |
| 8,191,215 B2 | 6/2012 | Meyer | |
| 8,309,644 B1 | 11/2012 | Huang | |
| 8,567,469 B2 | 10/2013 | Meyer et al. | |
| 8,568,549 B2 | 10/2013 | Meyer et al. | |
| 9,896,783 B2 | 2/2018 | Kia | |
| 9,920,454 B2 | 3/2018 | Sutti et al. | |
| 10,113,250 B2 | 10/2018 | Kia | |
| 2003/0100239 A1* | 5/2003 | Gaffney | .................. C04B 35/83 442/354 |
| 2004/0089129 A1 | 5/2004 | Toth | |
| 2010/0028593 A1 | 2/2010 | Taketa et al. | |
| 2012/0213997 A1 | 8/2012 | Wang et al. | |
| 2014/0264985 A1 | 9/2014 | Sutti et al. | |
| 2016/0194468 A1 | 7/2016 | Ogasawara et al. | |
| 2017/0067185 A1 | 3/2017 | Kia | |
| 2017/0067186 A1 | 3/2017 | Kia | |
| 2017/0314668 A1 | 11/2017 | Kia et al. | |
| 2018/0016740 A1 | 1/2018 | Kia et al. | |

FOREIGN PATENT DOCUMENTS

| | | | | |
|---|---|---|---|---|
| CN | 104024494 | A | 9/2014 | |
| CN | 106521716 | A | 3/2017 | |
| CN | 106521718 | A | 3/2017 | |
| CN | 107618194 | A | 1/2018 | |
| CN | 107866985 | A | 4/2018 | |
| DE | 3540411 | A1 | 5/1987 | |
| DE | 19944164 | A1 | 6/2000 | |
| DE | 102007012607 | A1 | 9/2008 | |
| DE | 102007012609 | A1 | 9/2008 | |
| DE | 102007012608 | A1 | 10/2008 | |
| DE | 102016116053 | A1 | 3/2017 | |
| DE | 102016116662 | A1 | 3/2017 | |
| DE | 102017115451 | A1 | 1/2018 | |
| DE | 102017121837 | A1 | 3/2018 | |
| EP | 2127840 | A1 | 12/2009 | |
| EP | 2679619 | A1 | 1/2014 | |
| EP | 2862971 | A1 | 4/2015 | |
| GB | 2373793 | A | 10/2002 | |
| JP | 2001-73230 | A | 3/2001 | |
| JP | 2013082229 | | * 5/2013 | ............... B32B 5/00 |
| WO | WO-2014100127 | A1 | 6/2014 | |

OTHER PUBLICATIONS

Hamid G. Kia et al.; U.S. Appl. No. 15/211,814, filed Jul. 15, 2016 entitled "Carbon Fiber Pre-Pregs and Methods for Manufacturing Thereof"; 44 pages.

Hamid G. Kia et al.; U.S. Appl. No. 15/685,157, filed Aug. 24, 2017 entitled "Modification of Continuous Carbon Fibers During Precursor for Composites Having Enhanced Moldability"; 40 pages.

Hamid G. Kia et al.; U.S. Appl. No. 15/141,361, filed Apr. 28, 2016 entitled "Linear Expansion Reduction of Metal Component Assemblies Using Composites"; 41 pages.

Hamid G. Kia et al.; U.S. Appl. No. 15/836,315, filed Dec. 8, 2017 entitled "Equipment for Perforated Pre-Impregnated Reinforcement Materials"; 54 pages.

First Office Action for German Patent Application No. 102017115451.5 dated May 18, 2018 correspondence dated May 28, 2018 from Manitz, Finsterwald & Partner summarizing contents; 5 pages.

First Office Action for Chinese Patent Application No. 201610771305.1 issued Jun. 12, 2018 with English language machine translation, 9 pages.

First Office Action for Chinese Patent Application No. 201610743811.X dated Jun. 21, 2018 with English language machine translation, 9 pages.

Polyacrylonitrile (PAN) Carbon Fibers Industrial Capability Assessment, OUSD (AT&L) Industrial Policy, U.S. Department of Defense (Oct. 2005); 23 pages.

Technical Data Sheet, "Polyacrylonitrile (PAN): how is it made?", Toray Carbon Fibers Europe, downloaded from http://www.toray-cfe.com/index.php/en/newsletter-v2/42-product/48-polyacrylonitrile-pan-how-is-it made, (published on or before Aug. 14, 2015); 2 pages.

Park, Soon-Jin, et al., "Precursors and Manufacturing of Carbon Fibers," Springer Series in Materials Science, vol. 210 (Oct. 9, 2014); pp. 31-66.

Cytec Industries Inc.; Safety Data Sheet for VTM® 264 Prepreg; Aug. 5, 2013; 9 pages.

Cytec Industrial Materials; VTM® 264-1 & VTM® 264S-1; PDS1268_07.13_Issue1a; Jul. 17, 2013; 3 pages.

First Office Action for German Patent Application No. 102017121837.8 dated Oct. 4, 2018 and correspondence dated Oct. 17, 2018 from Manitz, Finsterwald & Partner summarizing contents; 6 pages.

First Office Action for German Application No. 102016116662.6 dated Aug. 30, 2017; 6 pages.

First Office Action for German Application No. 102016116053.09 dated Aug. 29, 2017; 5 pages.

First Office Action for Chinese Patent Application No. 201710492904.4 dated Jan. 18, 2019 with correspondence dated Feb. 11, 2019 from China Patent Agent H.K. Ltd. summarizing contents, 9 pages.

* cited by examiner

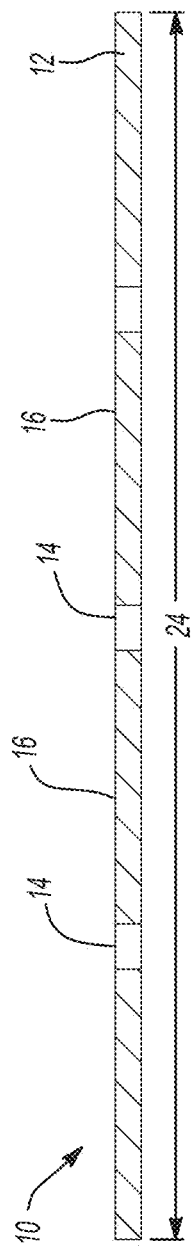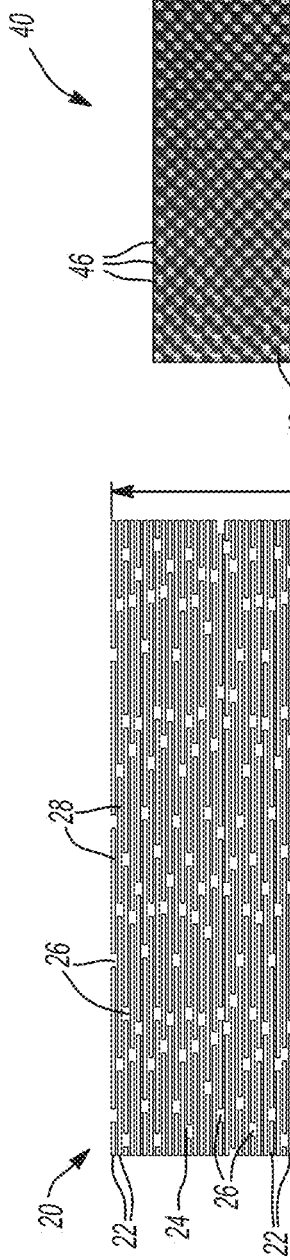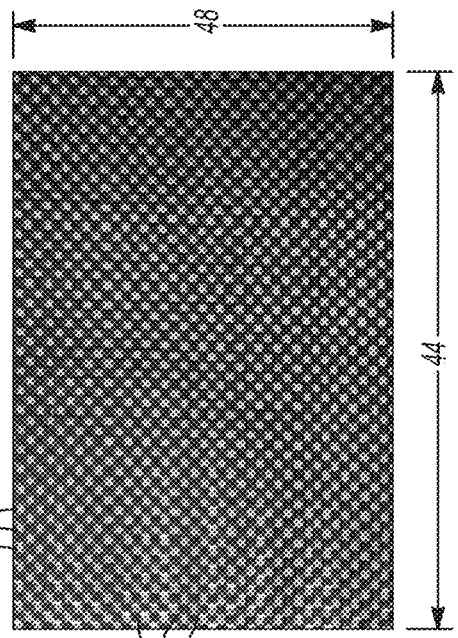

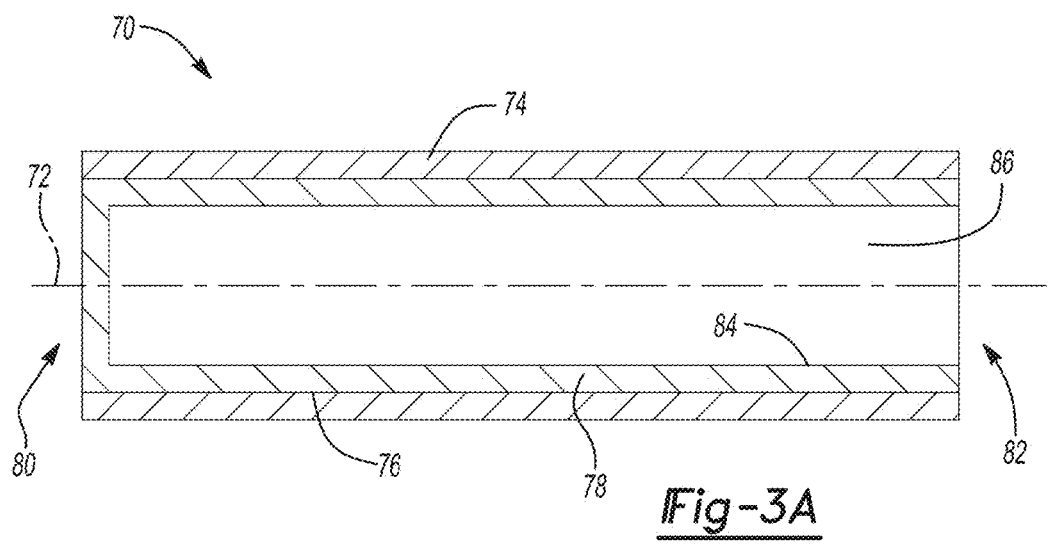
*Fig-3A*
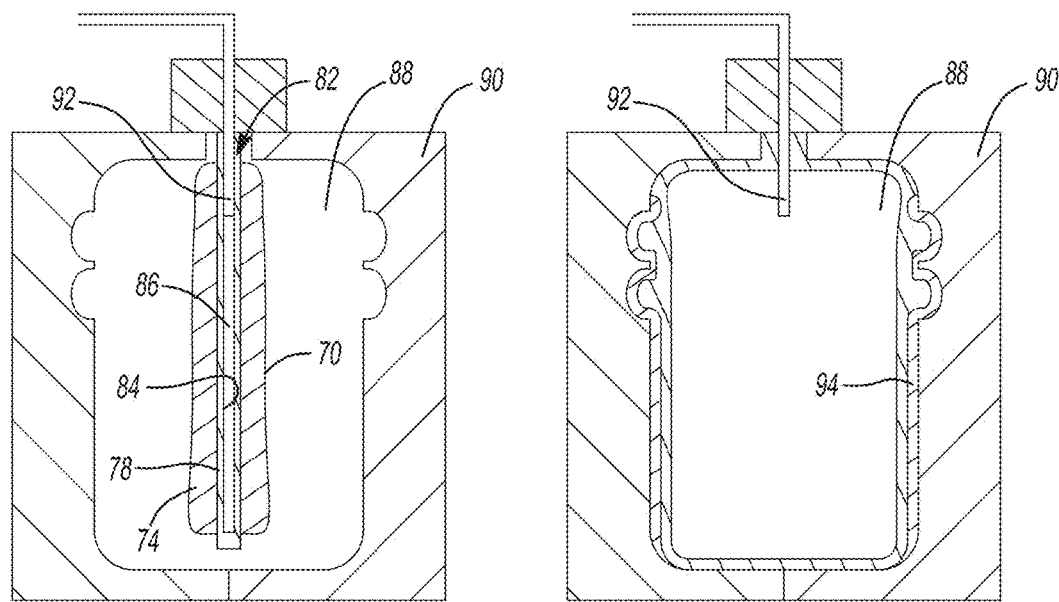
*Fig-3B*  *Fig-3C*

COMPONENTS MOLDED WITH MOLDABLE CARBON FIBER AND METHODS OF MANUFACTURING THEREOF

FIELD

The present disclosure relates to high strength carbon fiber composite components and methods of manufacturing thereof.

INTRODUCTION

This section provides background information related to the present disclosure which is not necessarily prior art.

Carbon fibers are used as a light-weight reinforcement phase to make high-strength light-weight polymeric composite materials. The carbon fibers may be continuous filaments that may be thousands of micrometers ($\mu$m) or millimeters (mm) in length. A group of continuous carbon fibers are often categorized as a bundle of continuous carbon fiber filaments. Carbon fiber "tow" is usually designated as a number of filaments in thousands (designated by K after the respective tow number). Alternatively, carbon fiber bundles may be chopped or milled and thus form short segments of carbon fibers (filaments or bundles) typically having a mean fiber length between 50 $\mu$m (about 0.002 inches) and 50 mm (about 1.97 inches). While composites incorporating carbon fibers are all light-weight and high-strength, composites incorporating continuous carbon fiber filaments have especially high strength as compared to composites incorporating chopped or milled carbon fibers. By way of non-limiting example, a representative unidirectional continuous carbon fiber filament when incorporated into a composite provides an ultrahigh ultimate tensile strength of about 1,500 to 2,000 MPa, while composites with chopped carbon fibers have an ultimate tensile strength of about 200 MPa to 350 MPa.

Composite articles or components can be formed by using sheets or strips of a reinforcement material, such as a carbon fiber-based material having continuous carbon fibers. Polymer precursors, such as resins, can be impregnated in carbon fiber-based substrate material systems, known as pre-impregnating (referred to as "pre-preg") that involves wetting a resin into the carbon fiber-based substrate material in a first step, then optionally winding up the carbon fiber-based substrate material, and storing it for later use.

While the ultrahigh strengths associated with carbon-fiber composites are highly desirable in certain applications, one challenge in using continuous carbon fibers composite pre-pregs is the lack of flowability and formability, because composite pre-pregs incorporating continuous carbon fibers can be too stiff with high resistance to flow. Such inflexibility and rigidity can translate to poor moldability, making it difficult to form three-dimensional shapes from composites having continuous carbon fibers. Further, lack of flowability in the pre-preg material can result in warpage in the final composite product and issues with undesirable surface appearance. It would be desirable to form continuous carbon fiber pre-preg materials having higher flowability, and thus greater moldability, with the capability of readily forming complex and three-dimensionally shaped components with ultrahigh-strengths.

SUMMARY

This section provides a general summary of the disclosure, and is not a comprehensive disclosure of its full scope or all of its features.

In various aspects, the present disclosure provides a structural component. The structural component includes a body defining at least one hollow region. The body includes a carbon fiber composite including a plurality of substantially aligned continuous carbon fibers. The plurality of substantially aligned carbon fibers defines a major axis and a second axis perpendicular to the major axis. The plurality of substantially aligned continuous carbon fibers includes a plurality of discrete termination points staggered with respect to the second axis.

In certain variations, the plurality of continuous carbon fibers further includes a first plurality of carbon fibers having a first distinct length and a second plurality of carbon fibers having a second distinct length. In certain other variations, the plurality of continuous carbon fibers includes one or more continuous carbon fibers having a length of greater than or equal to about 2 inches. The one or more continuous carbon fibers may include a plurality of discrete weak regions. The plurality of weak regions has an ultimate tensile strength that is at least 50% less than the strength of a remainder of the continuous carbon fiber. The carbon fiber composite has an ultimate tensile strength of greater than or equal to about 500 MPa.

In certain variations, the structural component is selected from the group consisting of: a hood, a pillar, a panel, a structural panel, a door panel, a door component, an interior floor, a floor pan, a roof, an exterior surface, an underbody shield, a wheel component, a storage area, a glove box, a console box, a trunk, a trunk floor, a truck bed, a lamp pocket, a shock tower cap, a control arm, a suspension component, a crush can, a bumper, a structural front rail, a structural frame, a cross car beam, an undercarriage component, a drive train component, and combinations thereof.

In other aspects, the present disclosure provides a method of producing a structural component. The method included creating a molding material by placing a sheet of a first carbon precursor material between two sheets of a second carbon fiber precursor material. The first carbon fiber precursor material and the second carbon fiber precursor material are distinct from one another. At least one of the first carbon fiber precursor material or the second carbon fiber precursor material includes a moldable carbon fiber precursor material. The moldable carbon fiber precursor material includes a plurality of substantially aligned continuous carbon fibers defining a major axis and a second axis perpendicular to the major axis. The plurality of substantially aligned continuous carbon fibers may include a plurality of distinct termination points staggered with respect to the second axis. The method includes compression molding the molding material to form the structural component.

In certain variations, the other of the first carbon fiber precursor material or the second carbon fiber material includes a plurality of continuous carbon fibers. The second carbon fiber precursor material has an ultimate tensile strength of greater than or equal to about 650 MPa.

In certain variations, the moldable carbon fiber precursor material includes a plurality of continuous carbon fibers and a polymer material precursor. The plurality of continuous carbon fibers has a plurality of staggered discontinuous cut regions that define a first plurality of carbon fibers having a first length and a second plurality of carbon fibers having a second distinct length. In other variations, the moldable carbon fiber precursor material includes one or more continuous carbon fibers having a length of greater than or equal to about 2 inches. The one or more continuous carbon fibers include a plurality of discrete weak regions. The plurality of weak regions may have an ultimate tensile strength that is at least 50% less than the strength of a remainder of the continuous carbon fiber. The carbon fiber composite has an ultimate tensile strength of greater than or equal to about 500 MPa.

In certain variations, a percentage flow based on surface area expansion of the moldable carbon fiber precursor material is greater than or equal to about 10%.

In yet other aspects, the present disclosure provides a method of producing a structural component having at least one interior cavity. The method includes placing a parison in a die. The parison includes a moldable carbon fiber precursor material disposed around a mandrel. The moldable carbon fiber precursor material includes a polymer precursor and a plurality of substantially aligned continuous carbon fibers defining a major axis and a second axis perpendicular to the major axis. The plurality of substantially aligned continuous carbon fibers includes a plurality of discrete termination points staggered with respect to the second axis. The method includes blow molding the parison to create the structural component. The method further includes include crosslinking or solidifying the polymer precursor to form the structural component.

In certain variations the moldable carbon fiber precursor material stretches by greater than or equal to about 10% with respect to its initial surface area during blow molding. In certain other variations, the moldable carbon fiber precursor material stretches by greater than or equal to about 200% with respect to its initial surface area during blow molding.

In certain variations, the method includes wrapping the moldable carbon fiber precursor material around the mandrel so at least a portion of an outer surface of the mandrel is disposed inside the moldable carbon fiber precursor material. In certain other variations, the method includes winding a filament including a moldable carbon fiber coated in the polymer precursor around an outer surface of the mandrel to form the parison.

In certain variations, the method includes heating the die to a temperature greater than or equal to about 50° C. and less than or equal to about 200° C. In certain variations, the method includes injecting a fluid into a cavity of the mandrel at about 120° C. and about 7 MPa. The fluid is optionally selected from a group consisting of: water, air, and oil.

In certain variations, the mandrel includes a polymeric material. The polymeric material is selected from the group consisting of: polyethylene $((C_2H_4)_n)$, polypropylene $((C_3H_6)_n)$, polyethylene terephthalate ("PET") $((C_{10}H_8O_4)_n)$, nylon, and shape memory epoxy resin. In certain variations, the mandrel includes a shape memory epoxy resin. In certain variations, the method includes heating the mandrel to greater than or equal to about 150° C. and less than or equal to about 200° C., and removing the mandrel from the structural component after blow molding.

In certain variations, the structural component has an ultimate tensile strength of greater than or equal to about 500 MPa.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 1A-1C relate to carbon fibers having at least one weak region; FIG. 1A shows a carbon fiber having at least one weak region; FIG. 1B shows a schematic of a moldable carbon fiber pre-impregnated composite precursor material having a plurality of discrete, noncontiguous, relatively weak regions or break points interspersed therein; FIG. 1C is an image of a fabric including a plurality of carbon fibers having at least one weak region;

FIG. 2 shows a schematic of a carbon fiber pre-impregnated composite precursor material having a cut surface pattern;

FIGS. 3A-3C show a method of forming a structural component from a moldable continuous carbon fiber precursor material according to certain aspects of the present disclosure; FIG. 3A shows a cross-section of a parison to be used in the blow molding process; FIGS. 3B-3C show cross-sections of an exemplary blow molding manufacturing process;

FIGS. 4A-4B show examples of hollow body components formed according to an aspect of the present technology; FIG. 4A shows a front view of a representative automotive rocker rail manufactured according to an aspect of the present technology; FIG. 4B shows a perspective view of the representative automotive rocker rail;

FIGS. 5A-5B show an exemplary compression molding manufacturing process; FIG. 5A shows two parts of a compression mold with molding material including a moldable carbon fiber precursor material disposed on one side; FIG. 5B shows two molds being joined together for compression molding;

Corresponding reference numerals indicate corresponding parts throughout several views of the drawings.

DETAILED DESCRIPTION

Figure 2:
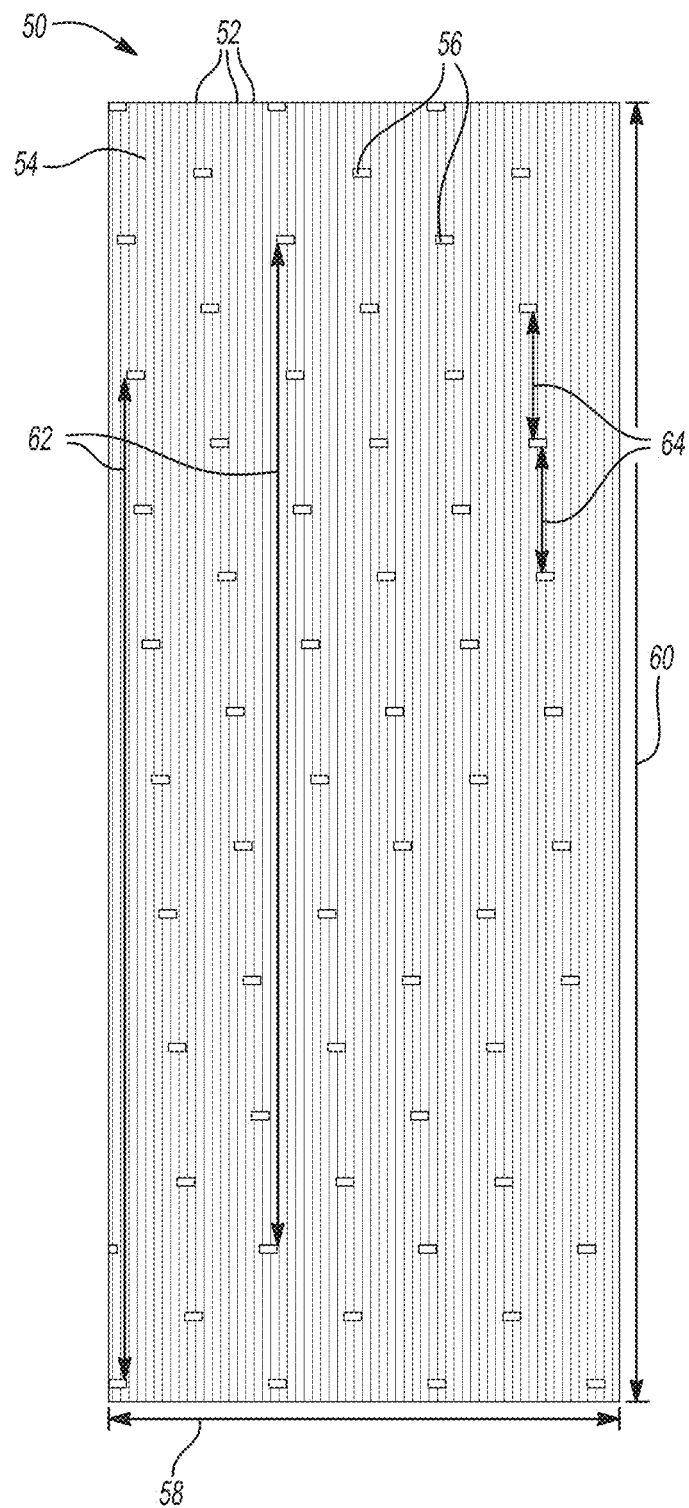

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise.

The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

Carbon-fiber reinforced polymeric composites (CFRP) include a resin that is cured and/or solidified to form a polymeric matrix having a plurality of carbon fibers distributed therein as a reinforcement phase. As discussed above, CFRPs are often created from a pre-preg, where bundles of the carbon fibers are used in sheets that are impregnated with uncured or partially cured resin. A component or part can be formed by using the pre-preg to be laid-up on a mandrel or disposed in a mold, where it is then consolidated and cured/reacted to form the final component.

As noted above, polymeric composites incorporating bundles of continuous carbon fibers are high-strength and light-weight; however, they are typically difficult to make into complex three-dimensional shaped components. In various aspects, the present disclosure pertains to treatment of a carbon fiber composite precursor material that include bundles of continuous carbon fibers, which in certain aspects have a length of greater than or equal to about 2 inches prior to treatment, as compared to precursor materials having chopped or milled carbon fibers. In certain aspects, a continuous carbon fiber has a length of greater than or equal to about 2 inches prior to treatment in accordance with certain aspects of the present disclosure optionally greater than or equal to about 3 inches, greater than or equal to about 4 inches, optionally greater than or equal to about 5 inches, optionally greater than or equal to about 6 inches, optionally greater than or equal to about 7 inches, optionally greater than or equal to about 8 inches, optionally greater than or equal to about 9 inches, optionally greater than or equal to about 10 inches, optionally greater than or equal to about 11 inches, and in certain variations, optionally greater than or equal to about 12 inches (or 1 foot). Continuous carbon fiber polymeric composites have very high strengths and high stiffness (with high elastic modulus levels). However, without further manipulation, such continuous carbon fiber polymeric composites are not readily made into contoured or complex three-dimensionally shaped parts and suffer from warpage and surface appearance issues.

Two techniques are currently used to form complex shaped parts from continuous carbon fiber composites, but both suffer from certain drawbacks. The first technique incorporates continuous carbon fibers into a composite sheet having continuous unidirectional carbon fibers, but then divides the larger composite sheet into multiple smaller pieces (either as a pre-preg or just before application to form the component). The smaller cut pieces are then assembled so that the edges of adjacent pieces overlap in a manual layup process to create a larger structure. The smaller pieces thus have hundreds of thousands of continuous carbon fiber filaments (e.g., cut bundles) that terminate on the same cut line(s). While the smaller pieces can be laid up to create more complex shapes and contours, this technique has the disadvantage of reducing strength of the part because the unidirectional carbon fiber filaments all end along the same cut line. Even though the cut pieces overlap, there remain various loci or regions for stress propagation and fracture throughout the composite along the cut lines that reduces overall strength.

Alternatively, in another technique, the carbon fiber bundles may be chopped or milled into shorter fiber segments, typically with a maximum length of less than about 2 inches, prior to be incorporated into a precursor (e.g., pre-preg) material. Each bundle may have approximately 50,000 filaments (e.g., 50K tow), by way of example. When carbon fibers are chopped, a tow of continuous carbon fibers is cut across an entire width of the tow, so that a continuous clean cut occurs at predetermined distances. Typically, after cutting, the chopped fibers may be distributed in a random orientation homogenously within the pre-preg or composite as an isotropic reinforcement phase. However, the short chopped fibers are discontinuous and provide open regions between distinct fibers for stress and crack propagation through the resin/polymeric matrix. While still providing high strengths, chopped carbon fiber composites typically have lower strengths than continuous carbon fiber composites, often an order of magnitude less.

In certain aspects, the present technology contemplates a method of producing a structural component having enhanced strength from a moldable carbon fiber precursor material. In certain aspects, the moldable carbon fiber precursor material is a pre-impregnated composite material. In other aspects, the present technology contemplates a method of producing a structural component having enhanced strength from a moldable carbon fiber precursor material in a blow molding process. In certain aspects, the moldable carbon fiber precursor material used in the blow molding process is a pre-impregnated composite material. In yet other aspects, the method may include a compression molding process. In certain variations, the structural component is molded from a molding material including a moldable carbon precursor material having one or more staggered weak regions or staggered termination points and a continuous carbon fiber precursor material without such weak regions or termination points. In other aspects, the present technology contemplates a method of producing a structural component from a precursor material in the form of a fabric. In certain aspects, the fabric may include moldable carbon fibers having a plurality of weak regions and/or staggered termination points. In still other aspects, the present disclosure contemplates a three-dimensional structural component formed in accordance with the above methods and having enhanced strength as compared to a chopped or milled carbon fiber composite.

In certain aspects, the present technology contemplates structural components formed from moldable carbon fiber pre-impregnated composite precursors including continuous carbon fibers having one or more weak regions. Such moldable carbon fiber pre-impregnated composite precursor materials are described more fully in U.S. patent application Ser. Nos. 14/849,010 and 14/849,025, commonly filed on Sep. 9, 2015, each of which is expressly incorporated herein by reference in its entirety.

FIG. 1A shows a carbon fiber 10 including a body 12 having a plurality of weak regions 14 dispersed within high strength regions 16 of the body 12. In certain aspects, a weak region 14 is intended to mean a region that preferentially fractures or breaks when stress is applied as compared to the remainder of the body 12. In other aspects, the weak region 14 may in fact be a pre-cut or preformed termination point. In certain aspects, a weak region may be understood to have a strength (e.g., an ultimate tensile strength) that is at least about 50% less than a comparative ultimate tensile strength of a remainder of the continuous carbon fiber, optionally at least about 60%, optionally at least about 70%, optionally at least about 80%, and in certain aspects, optionally at least about 90% less than a comparative strength of the high strength regions of the remainder of the body of the carbon fiber. Introduction of these weak domains or regions enables formation of carbon-fiber polymeric composites having high strength and low resistivity to flow, thus being more malleable and moldable.

The weak regions may include localized molecular structural disruptions, a distinct material composition, or mechanical deformation or stretching, by way of non-limiting example. In one example, the continuous fiber is PAN-based and has a tensile strength of 5,000 MPa, whereas the weak region is lignin-based and has a tensile strength of 100 MPa. The weak region including lignin has about 98% less strength than the strong PAN-based region. In another example, both of the continuous carbon fiber and the weak region are PAN-based materials with different compositions. The continuous carbon fiber has a first composition including PAN with a weight average molecular weight of 100,000, whereas the weak region has a second composition including PAN with a weight average molecular weight of 10,000. In still another example, the both of the continuous carbon fiber and the weak region are pitch-based compositions. The continuous carbon fiber has a first composition based on a mesophase pitch precursor, whereas the weak region has a composition based on an isotropic pitch precursor.

An exemplary moldable carbon fiber pre-impregnated composite precursor material 20 is shown in FIG. 1B. The moldable carbon fiber pre-impregnated composite precursor material 20 has a plurality of continuous carbon fibers 22 and a polymeric matrix 24 distributed within and around the continuous carbon fibers 22. The continuous carbon fibers 22 have a plurality of weak regions 26 distributed at regular intervals along each continuous carbon fiber 22. Thus, the continuous carbon fiber 22 includes a high strength region 28 having the plurality of weak regions 26 dispersed within the high strength regions of the region 28.

The plurality of weak regions 26 is staggered throughout the continuous carbon fibers 22 across a width 30 of the moldable carbon fiber pre-impregnated composite precursor material 20. Thus, the locations of the weak regions 26 differ along both the width 30 and a length 32 of the moldable carbon fiber pre-impregnated composite precursor material 20. The plurality of continuous carbon fibers may be substantially aligned and may define a major axis and a second axis perpendicular to the major axis. The weak regions 26 may define a plurality of discrete potential termination points across the length 32 of the composite 20. The termination points may be staggered with respect to the second axis. In this manner, the continuous carbon fibers 22 are capable of breaking at the weak regions 26 when bent, folded, or otherwise stressed, while not permitting stress and fracture propagation across the width 30 or length 32 of the composite 20. This maintains the strength of the composite 20 to near the strength levels provided by high strength continuous carbon fibers, but also provides lower stiffness and greater flexibility (with a lower resistance to flow). It should be noted that in alternative aspects, the plurality of weak regions 26 may instead be pre-cut or preformed termination points.

The moldable carbon fiber pre-impregnated composite precursor material 20 prepared in accordance with certain aspects of the present disclosure still has an ultrahigh strength, for example, an ultimate tensile strength of greater than or equal to about 500 MPa, optionally greater than or equal to about 1,000 MPa, optionally greater than or equal to about 1,500 MPa, optionally greater than or equal to about 1,750 MPa, and in certain aspects, optionally greater than or equal to about 2,000 MPa.

In certain other aspects, the present technology contemplates structural components formed from a precursor that is a moldable fabric including continuous carbon fibers having one or more weak regions, as shown in FIG. 1C. A moldable carbon fiber fabric 40 may include a first plurality of continuous carbon fibers 42 substantially parallel to its length 44, and a second plurality of continuous carbon fibers 46 substantially parallel to its width 48. It should be noted that fabric may also include cloth, felted, crimped or non-crimp fabric (NCF) structures with a plurality of intertwined carbon fibers in addition to woven (e.g., warp and weft) fabrics. At least one of the first plurality of continuous carbon fibers 42 and the second plurality of continuous carbon fibers 46 may include a plurality of moldable continuous carbon fibers. A plurality of moldable continuous carbon fibers may include the carbon fiber having one or more weak regions as described in conjunction with FIG. 1A, by way of non-limiting example. In certain variations, the present technology contemplates a bidirectional moldable carbon fiber fabric, wherein both of the first plurality of continuous carbon fibers 42 and the second plurality of carbon fibers 46 include a plurality of moldable continuous carbon fibers. In certain other variations, the present technology contemplates a unidirectional moldable carbon fiber fabric, wherein one of the first plurality of continuous carbon fibers 42 and the second plurality of continuous carbon fibers 44 includes a plurality of moldable continuous carbon fibers and the other one of the first plurality of continuous carbon fibers 42 and the second plurality of continuous carbon fibers 46 includes a plurality of high strength continuous carbon fibers without any weak regions or termination points.

In certain aspects, the present technology contemplates structural components formed from moldable carbon fiber pre-impregnated composite precursors having at least two discrete fiber lengths. Such moldable carbon fiber composite precursor materials are described more fully in U.S. patent application Ser. No. 15/211,814, filed Jul. 15, 2016, the contents of which are incorporated by reference in its entirety.

An exemplary moldable carbon fiber pre-impregnated composite precursor material 50 is shown in FIG. 2. The moldable carbon fiber precursor material 50 can be a sheet including a plurality of continuous carbon fibers 52 imbibed with a polymer material precursor 54 to form a pre-impregnated precursor. The plurality of continuous carbon fibers 52 has a plurality of cut regions 56 that are discrete and discontinuous. As shown, the plurality of cut regions 56 is staggered across a width 58 of the precursor material 50 that will form a carbon-fiber reinforced composite. Thus, the locations of the cut regions 56 also differ in position with respect to one another along a length 60 of each continuous carbon fiber 52 (with respect to adjacent carbon fibers 52).

The plurality of continuous carbon fibers 52 thus have a plurality of staggered discontinuous or discrete cut regions 56 that define a first plurality of carbon fibers 62 having a first length and a second plurality of carbon fibers 64 having a second distinct length. The continuous carbon fibers 52 may be greater than or equal to about 2 inches. The cut regions 56 may have dimensions having a width of greater than or equal to about 0.2 mm to less than or equal to about 2 mm, optionally greater than or equal to about 0.1 mm to less than or equal to about 3 mm, by way of non-limiting example.

The first plurality of carbon fibers 52 may have a first length of greater than or equal to about 5 mm to less than or equal to about 15 mm and the second plurality of carbon fibers 54 may have a second length of greater than or equal to about 20 mm to less than or equal to about 90 mm. In certain variations, the first length is greater than or equal to about 5 mm to less than or equal to about 10 mm and the second distinct length is greater than or equal to about 40 mm to less than or equal to about 85 mm. In one aspect, the first length is about 10 mm and the second distinct length is about 85 mm.

The plurality of continuous carbon fibers 52 may be substantially aligned and may define a major axis and a second axis perpendicular to the major axis. The staggered cut regions 56 define a plurality of discrete termination points along the length 60 of the composite 50. The discrete termination points are staggered with respect to the second axis. Introduction of these staggered cut regions 56 enables formation of moldable carbon fiber polymeric composites having high strength and low resistivity to resin flow, thus being more malleable and moldable. Such a carbon fiber composite made from a moldable carbon fiber pre-impregnated composite precursor material having a plurality of staggered discontinuous cut regions still exhibits an ultra-high strength, for example, greater than or equal to about 500 MPa. In certain variations, the ultimate tensile strength is greater than or equal to about 600 MPa, optionally greater than or equal to about 700 MPa, optionally greater than or equal to about 800 MPa, optionally greater than or equal to about 900 MPa, optionally greater than or equal to about 1,000 MPa, optionally greater than or equal to about 1,250 MPa, and in certain aspects, optionally greater than or equal to about 1,500 MPa.

Table 1 shows tensile strength for various types of carbon fibers. Comparative high strength continuous carbon fiber strengths and comparative chopped or milled carbon fiber strengths are provided in comparison to continuous carbon fibers having one or more weak regions or cut regions prepared in accordance with certain aspects of the present disclosure.

TABLE 1

| Fiber | Tensile Strength (in composite) |
| --- | --- |
| Comparative high strength continuous carbon fibers | 1500-2000 MPa |
| Comparative chopped or milled carbon fibers having an average length of <2 inches | 200-350 MPa |
| Moldable Fibers | |
| Continuous carbon fibers having one or more weak regions | 500-2000 MPa |
| Continuous carbon fibers having a plurality of cut regions | 500-1500 MPa |

In certain aspects, the present technology contemplates a method of producing a structural component formed of a composite material and having enhanced strength in a blow molding system. Referring to FIGS. 3A-3C, a parison 70 having a central axis 72 may include a moldable carbon fiber precursor material 74 disposed around an outer surface 76 of a mandrel 78. The moldable carbon fiber precursor material 74 may cover at least a portion of the outer surface 76 of the mandrel 78. The mandrel 78 may have a closed end 80, an open end 82, an inner surface 84, and a cavity 86 defined by the inner surface 84.

An exemplary blow molding process is shown in FIGS. 3B-3C. The parison 70 may be placed into a cavity 88 of a mold 90 having a three-dimensional shape. The open end 82 of the parison 70 may be in fluid communication with a nozzle 92. The parison 70 may be heated by heating the mold 90, for example. The temperature may be greater than or equal to about 50° C. and less than or equal to about 200° C. Alternatively, the parison 70 may be heated by flowing a heated fluid through the cavity 86 of the mandrel 84. Pressurized fluid, which may be air, water, or oil, as non-limiting examples, enters the cavity 86 of the mandrel 78 through the nozzle 92. The fluid may enter the cavity 86 at a pressure greater than or equal to about 1 MPa and less than or equal to about 20 MPa. The pressure of the heated fluid against the inner surface 84 of the mandrel 78 causes the mandrel 78 and the moldable carbon fiber precursor material 74 to expand together to create a component having the three-dimensional shape of the mold cavity 88. The moldable carbon fiber precursor material 74 may be crosslinked or solidified to form a structural component 94.

Returning to FIG. 3A, the mandrel 78 may be formed of a plastic or polymeric material. Suitable materials include: polyethylene $((C_2H_4)_n)$, polypropylene $((C_3H_6)_n)$, polyethylene terephthalate (PET) $((C_{10}H_8O_4)_n)$, nylon, and shape memory epoxy resins, by way of non-limiting example. In certain variations, the material of the mandrel 78 may form an interior portion of the structural component. In other variations, the shaped mandrel 78 may be removed after blow molding. For example, the mandrel 78 may include a shape memory polymer that can be heated and melted away, thereby forming a structural component having only substantially carbon fiber composite. In certain aspects, the mandrel may be heated to greater than or equal to about 150° C. and less than or equal to about 200° C., optionally about 170° C., by way of example, for removal from the structural component.

In certain variations, the moldable carbon fiber precursor material 74 may cover only a portion of the mandrel 78. In certain other variations, the carbon fiber precursor material 74 may cover substantially the entire outer surface 76 of the mandrel 78, including the closed end 80.

In certain aspects, a sheet including a moldable carbon fiber precursor material 74 may be wrapped around the outer surface 76 of the mandrel 78 to form the parison 70. The moldable carbon fiber precursor material 74 may be wrapped such that a plurality of carbon fibers of the moldable carbon fiber precursor material 74 commonly define a major longitudinal axis that is substantially parallel with the central axis 72 of the parison 70. In other aspects, the moldable carbon fiber precursor material 74 may be wrapped such that the major longitudinal axis of the plurality of carbon fibers of the moldable carbon fiber precursor material 74 is substantially perpendicular to the central axis 72 of the parison 70. Other angles of orientation are likewise contemplated. Further, multiple sheets of moldable precursor materials may be disposed on the mandrel 78 in different orientations. In still other aspects, the carbon fiber precursor material 74 may be disposed around the mandrel 78 by a filament winding process, so that the plurality of carbon fibers of the moldable carbon fiber precursor material 74 is substantially perpendicular to the central axis 72 of the parison 70.

In certain aspects, the moldable carbon fiber precursors, such as a moldable carbon fiber pre-impregnated composite precursor material, may include a plurality of carbon fibers having one or more weak regions, as discussed in conjunction with FIGS. 1A-1C. In other aspects, the moldable carbon fiber precursor material may include a plurality of carbon fibers having at least two discrete fiber lengths, as discussed in conjunction with FIG. 2. The moldable carbon fiber precursor material has decreased resistance to flow when compared to high strength continuous carbon fibers, while maintaining high tensile strength. For example, the moldable carbon fiber precursor material may stretch greater than or equal to about 10% of its initial surface area during blow molding, optionally greater than 100% of its initial surface area, and optionally greater than 200% of its original surface area.

Figure 4A:
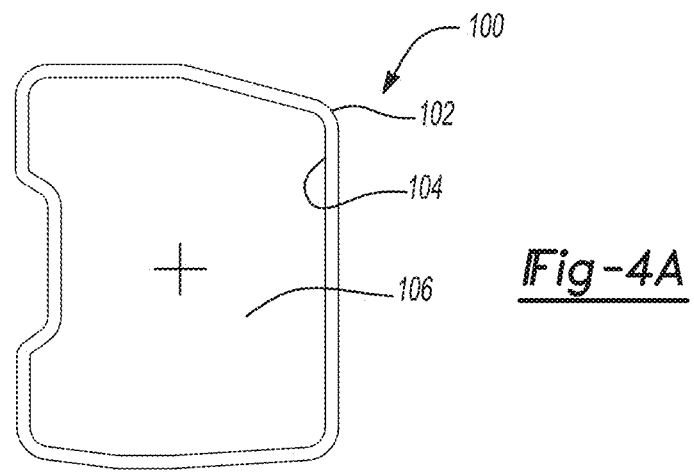
Figure 4B:
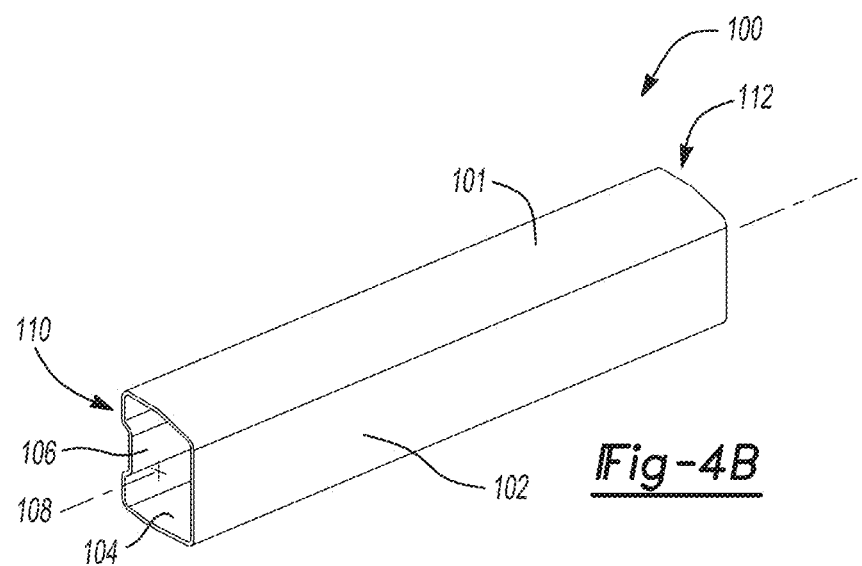

The method of producing a structural component having enhanced strength in a blow molding system is particularly suitable for forming structural components having at least one hollow region, for example, automotive components, such as structural front rails, and crush cans, by way of non-limiting example. Referring to FIGS. 4A-4B, an exemplary structural component formed in accordance with the present technology is shown. The structural component, a rocker rail 100, includes a body 101 having an outer surface 102 and an inner surface 104. The inner surface 104 of the body 101 defines a hollow interior region or cavity 106. An axis 108 extends through the center of the cavity 106 from a first end 110 to a second end 112. The hollow body 101 may include a moldable carbon fiber precursor material.

The moldable carbon fiber precursor material may include a plurality of substantially aligned continuous carbon fibers defining a major axis and a second axis perpendicular to the major axis. The plurality of substantially aligned continuous carbon fibers may have a plurality of discrete termination points staggered with respect to the second axis. In certain variations, the major axis may be substantially parallel to the central axis of the structural component. In other variations, the major axis may be substantially perpendicular to the central axis. In still other variations, the major axis may form an angle with respect to the central axis. The angle may be greater than about zero (0) degrees and less than about ninety (90) degrees.

In one example, an automotive front rail is formed in accordance with the present technology. A polypropylene mandrel is wrapped with a moldable carbon fiber precursor material including a plurality of carbon fibers having one or more weak regions to form a parison. The parison is placed into a 120° C. mold cavity. Pressurized water is injected into an open end of the parison at 7 MPa and 120° C. The moldable carbon fiber precursor material stretches by about 28% of its initial surface area during blow molding. The polypropylene material from the mandrel is removed. After crosslinking, the front rail has an ultimate tensile strength of about 700 MPa.

Figure 5A:
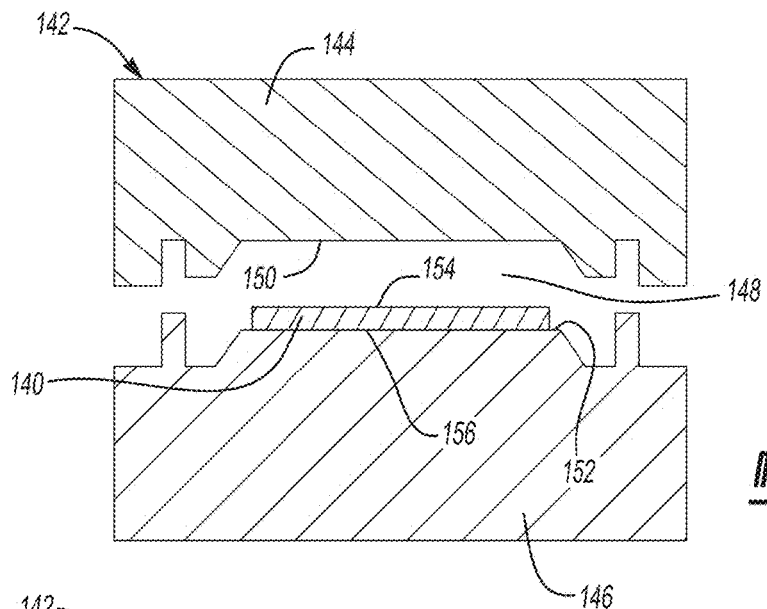
Figure 5B:
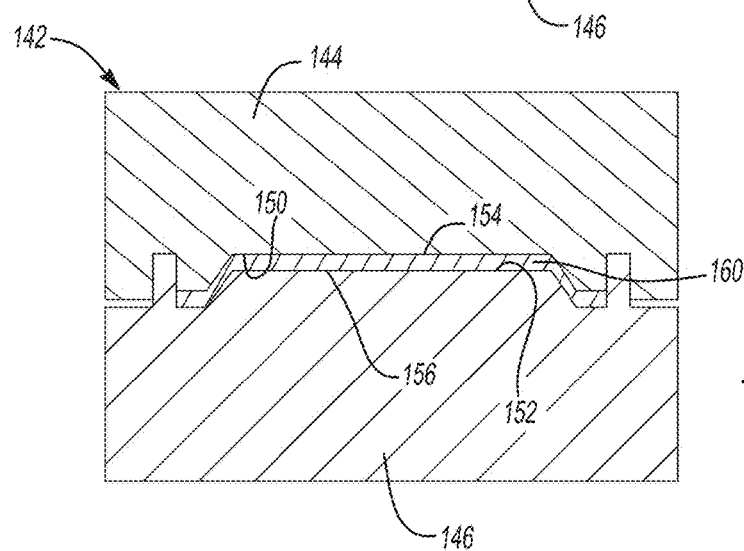

In certain aspects, the present technology contemplates a method of producing a component having enhanced strength in a compression molding system like that shown in FIGS. 5A-5B. A charge or sheet of a molding material 140 including a moldable carbon fiber precursor material can be placed into a mold 142. The mold may include an upper mold 144, a lower mold 146, and a cavity 148 disposed between the upper mold 144 and the lower mold 146. The cavity 148 may include an upper surface 150 and a lower surface 152. The cavity 148 may be heated to a temperature of greater than or equal to about 50° C. and less than or equal to about 250° C., optionally about 150° C., by way of example. The mold 142 may be closed under pressure around the molding material 140 so that a bottom surface 154 of the molding material 140 is at least partially in contact with the lower surface 152 of the cavity 146 and a top surface 156 of the molding material 140 is at least partially in contact with the upper surface 150 of the cavity 146. The pressure may be greater than or equal to about 1 MPa and less than or equal to about 20 MPa, optionally about 7 MPa, by way of example. The application of heat and pressure to the moldable carbon fiber precursor material may cause the moldable carbon fiber precursor material to crosslink or solidify, thereby forming a structural component 160. The duration of this process may be greater than or equal to about 1 minute and less than or equal to about 10 minutes, optionally about 3 minutes, by way of example.

Figure 6:
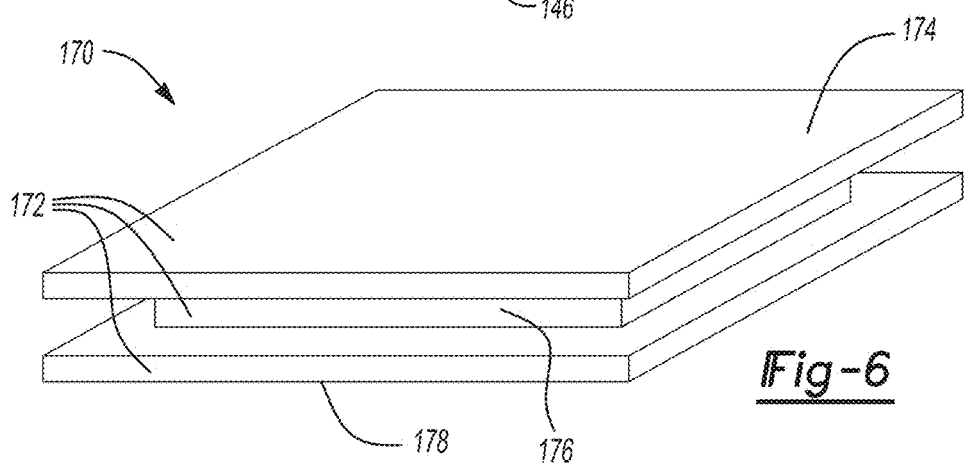
FIG. 6 shows a perspective view of a molding compound according to an aspect of the present disclosure.

Referring to FIGS. 5A, 5B, and 6, in another variation, the present technology contemplates a method of producing a composite having enhanced strength in the compression molding system like that shown in FIGS. 5A-5B. Referring to FIG. 6, a molding material 170 may include a plurality of layers 172. The plurality of layers 172 may include a first layer 174, a second layer 176, and a third layer 178, by way of non-limiting example. The first and third layers 174 and 178 sandwich the second layer 176. Although FIG. 6 depicts three layers, other quantities of layers, such as two or four, are contemplated within the scope of the present disclosure. One of the first layer 174, the second layer 176, or the third layer 178 may include a moldable carbon fiber composite precursor material prepared in accordance with certain aspects of the present technology. Another one of the first layer 174, the second layer 176, or the third layer 178 may include a high strength continuous carbon fiber composite precursor material that is not treated to include weak regions or termination points. In certain variations, the first layer 174 and the third layer 178 may include a first material composition, while the second layer 176 includes a distinct second material composition.

The use of a layered molding material in a method according to certain aspects of the present technology may provide increased strength when compared to a molding material including a single moldable carbon fiber precursor material, without sacrificing moldability and flowability. For example, a molding material may include a moldable carbon fiber precursor layer and a continuous carbon fiber precursor layer. The moldable carbon fiber precursor material may have greater flow in a direction perpendicular to the direction of compression than the continuous carbon fiber precursor material, thereby enabling flow to edges and corners of a mold cavity.

Figure 7:
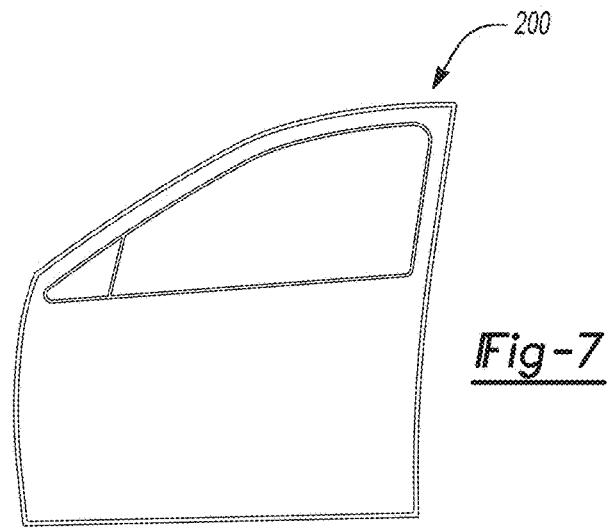
FIG. 7 shows a perspective view of a representative automotive door according to an aspect of the present technology.
Figure 8:
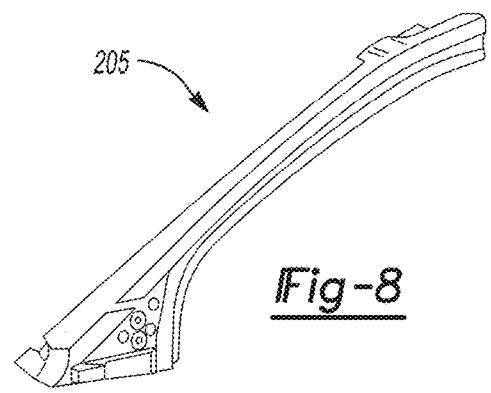
FIG. 8 shows a perspective view of a representative automotive A-pillar manufactured according to an aspect of the present disclosure.
Figure 9:
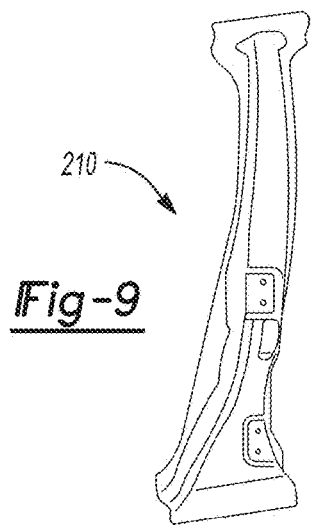
FIG. 9 shows a perspective view of a representative automotive B-pillar manufactured according to an aspect of the present disclosure.

The method of producing a structural component having enhanced strength in a compression molding is particularly suitable for forming structural components, for example, an automotive body panel. FIG. 7 depicts an exemplary automotive body panel, a car door 200, formed by such techniques in accordance with certain aspects of the present disclosure. The present technology may also be used in a variety of other applications and industries, for example, automotive structural components having contoured or complex three-dimensional shapes. FIG. 8 depicts an exemplary A-pillar 205 formed via compression molding in accordance with certain aspects of the present technology. FIG. 9 depicts an exemplary B-pillar 210 formed via compression molding in accordance with certain aspects of the present technology.

In one example, an automotive inner hood panel is formed in accordance with the present technology. A sheet including a continuous carbon fiber composite precursor material weighing 1 kg is placed disposed on top of a sheet including a moldable carbon fiber precursor material weighing 1 kg. A second sheet including a moldable carbon fiber precursor material weighing 1 kg is disposed on top of the sheet including a high strength continuous carbon fiber precursor material to form a molding material. The molding material is placed into a mold cavity and compressed under 7 MPa pressure at 120° C. for 3 minutes to provide at least about 80% mold coverage, with about 20% flow based on surface area expansion thereby forming an inner hood panel. The automotive body panel has an ultimate tensile strength of about 700 MPa. The strength of the automotive body panel formed in accordance with certain aspects of the present disclosure has an ultimate tensile strength of greater than or equal to about 90%, optionally about 100% that of a composite including high strength continuous carbon fiber precursor material.

In certain aspects, the present technology contemplates a method of producing a component having enhanced strength from a moldable carbon fiber fabric like that shown in FIG. 1C. A fabric including moldable carbon fibers is stretched or draped to a desired shape. The fabric may be stretched and draped into a preform by a variety of techniques including manual layup, by way of non-limiting example. The moldability of the fabric may allow the fibers to slide past one another without cutting or slitting. The moldable preform may be formed into a structural component through resin transfer molding ("RTM"). By way of non-limiting example, the mold is heated to about 120° C., then the mold is opened and the previously stretched and draped fabric is placed in the mold. The mold is then closed, vacuum is applied, and an epoxy resin is injected into the mold to fill the mold cavity. The mold is then maintained closed at 120° C. for 3 minutes. The mold is opened and the component is ejected.

Figure 10:
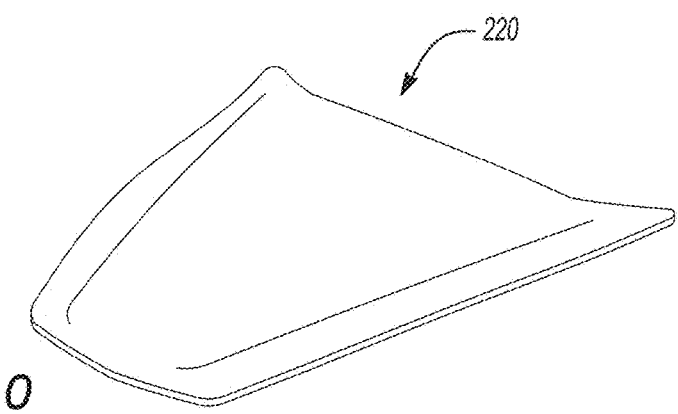
FIG. 10 shows a perspective view of a representative automotive hood panel according to an aspect of the present technology.

The method of producing a structural component having enhanced strength from a moldable carbon fiber fabric is particularly suitable for forming structural components requiring high surface quality and minimal warpage, for example, an automotive Class A component. FIG. 10 depicts an exemplary automotive Class A component, an automotive hood panel 220, formed in accordance with the present disclosure.

In certain aspects, the present technology contemplates structural components manufactured according to the above methods or any others contemplated by those skilled in the art. The structural components may include a moldable carbon fiber precursor material having a plurality of substantially aligned continuous carbon fibers defining a major axis and a second axis perpendicular to the major axis. The plurality of substantially aligned continuous carbon fibers may have a plurality of discrete termination points staggered with respect to the second axis. Moldable carbon fiber precursor materials used in accordance with the present disclosure avoid separation of the resin and fibers and thus avoid or minimize warpage. Thus, composites formed from the carbon fiber precursor materials of the present disclosure exhibit improved surface quality of unpainted panels, by avoiding fiber distortion around curvatures during the molding process. Additionally, composites formed from the moldable carbon fiber precursor materials do not suffer loss of mechanical properties.

In certain aspects, the present technology may be used in a variety of other applications and industries, for example, automotive structural components having contoured or complex three-dimensional shapes. Non-limiting examples include hoods, pillars, such as hinge pillars, panels, including structural panels, door panels, and door components, interior floors, floor pans, roofs, exterior surfaces, underbody shields, wheels, storage areas, including glove boxes, console boxes, trunks, trunk floors, truck beds, lamp pockets, shock tower caps, control arms and other suspension components, crush cans, bumpers, structural rails and frames, cross car beams, undercarriage or drive train components, and the like. In certain aspects, the present technology may also be used to form components in other industries, including, but not limited to: vehicles (e.g., motorcycles), marine (e.g., boat hulls and deck, jet skis), aerospace (e.g., airplanes, helicopters, drones), and sports (e.g., bicycles, tennis rackets).

In certain aspects, the present technology may use multiple components in assembly. An assembly formed in accordance with certain aspects of the present disclosure may include dissimilar materials, like materials, or other components.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A structural component comprising:
   a body defining at least one hollow region, wherein the body comprises a carbon fiber composite comprising a plurality of substantially aligned continuous carbon fibers defining a major axis and a second axis perpendicular to the major axis, wherein the plurality of substantially aligned continuous carbon fibers comprise a plurality of discrete termination points staggered with respect to the second axis, wherein the plurality of substantially aligned continuous carbon fibers comprises one or more continuous carbon fibers having a length of greater than or equal to about 2 inches, wherein the one or more continuous carbon fibers comprise a plurality of discrete weak regions along the length of the one or more continuous carbon fibers, wherein the plurality of discrete weak regions comprise a composition that has an ultimate tensile strength that is at least 50% less than the ultimate tensile strength of the remainder of the length of the one or more continuous carbon fibers.

2. The structural component of claim 1, wherein the plurality of substantially aligned continuous carbon fibers further comprises a first plurality of carbon fibers having a first distinct length and a second plurality of carbon fibers having a second distinct length.

3. The structural component of claim 1, wherein the structural component is selected from the group consisting of: a hood, a pillar, a panel, a structural panel, a door panel, a door component, an interior floor, a floor pan, a roof, an exterior surface, an underbody shield, a wheel component, a storage area, a glove box, a console box, a trunk, a trunk floor, a truck bed, a lamp pocket, a shock tower cap, a control arm, a suspension component, a crush can, a bumper, a structural front rail, a structural frame, a cross car beam, an undercarriage component, a drivetrain component, and combinations thereof.

4. The structural component of claim 1, wherein the one or more continuous carbon fibers comprise a first composition and the plurality of discrete weak regions comprise a second composition, the first composition having a first weight average molecular weight and the second composition having a second weight average molecular weight, the second weight average molecular weight being less than the first weight average molecular weight.

5. The structural component of claim 4, wherein the first composition includes polyacrylonitrile (PAN) and the second composition includes PAN.

6. The structural component of claim 1, wherein the one or more continuous carbon fibers comprise a first composition and the plurality of discrete weak regions comprise a second composition, the first composition comprising a mesophase pitch precursor, and the second composition comprising an isotropic pitch precursor.

7. The structural component of claim 1, wherein the plurality of substantially aligned continuous carbon fibers is a primary plurality of substantially aligned continuous carbon fibers and the carbon fiber composite further comprises a secondary plurality of substantially aligned continuous carbon fibers, the secondary plurality of substantially aligned continuous carbon fibers extended non-parallel to the major axis.

8. The structural component of claim 7, wherein the secondary plurality of substantially aligned continuous carbon fibers extend substantially perpendicular to the primary plurality of substantially aligned continuous carbon fibers.

9. The structural component of claim 1, wherein the carbon fiber composite has an ultimate tensile strength of greater than or equal to about 700 MPa.

10. A structural component comprising:
    a body defining at least one hollow region, wherein the body comprises a carbon fiber composite comprising a plurality of substantially aligned continuous carbon fibers defining a major axis and a second axis perpendicular to the major axis, wherein the plurality of substantially aligned continuous carbon fibers comprise a plurality of discrete termination points staggered with respect to the second axis, wherein the plurality of substantially aligned continuous carbon fibers comprises one or more continuous carbon fibers having a length of greater than or equal to about 2 inches, wherein the one or more continuous carbon fibers comprise a plurality of discrete weak regions along the length of the one or more continuous carbon fibers, wherein the plurality of discrete weak regions comprise a composition that has an ultimate tensile strength that is at least 50% less than the ultimate tensile strength of the remainder of the length of the one or more continuous carbon fibers, and the carbon fiber composite has an ultimate tensile strength of greater than or equal to about 500 MPa.

11. A method of producing a structural component having at least one interior cavity, the method comprising:
placing a parison comprising a moldable carbon fiber precursor material disposed around a mandrel in a die, wherein the moldable carbon fiber precursor material comprises a polymer precursor and a plurality of substantially aligned continuous carbon fibers defining a major axis and a second axis perpendicular to the major axis, wherein the plurality of substantially aligned continuous carbon fibers comprise a plurality of discrete termination points staggered with respect to the second axis, wherein the plurality of substantially aligned continuous carbon fibers comprises one or more continuous carbon fibers having a length of greater than or equal to about 2 inches, wherein the one or more continuous carbon fibers comprise a plurality of discrete weak regions along the length of the one or more continuous carbon fibers, wherein the plurality of discrete weak regions comprise a composition that has an ultimate tensile strength that is at least 50% less than the ultimate tensile strength of the remainder of the length of the one or more continuous carbon fibers;
blow molding the parison to create the structural component; and
crosslinking or solidifying the polymer precursor to form the structural component.

12. The method of claim 11, wherein the moldable carbon fiber precursor material stretches by greater than or equal to about 10% with respect to an initial surface area of the moldable carbon fiber precursor during blow molding.

13. The method of claim 12, wherein the moldable carbon fiber precursor material stretches by greater than or equal to about 200% with respect to an initial surface area of the moldable carbon fiber precursor material during blow molding.

14. The method of claim 11, further comprising wrapping the moldable carbon fiber precursor material around the mandrel so at least a portion of an outer surface of the mandrel is disposed inside the moldable carbon fiber precursor material.

15. The method of claim 11, further comprising winding a filament comprising a moldable carbon fiber coated in the polymer precursor around an outer surface of the mandrel to form the parison.

16. The method of claim 11, further comprising heating the die to a temperature greater than or equal to about 50° C. and less than or equal to about 200° C.

17. The method of claim 11, further comprising injecting a fluid into a cavity of the mandrel at about 120° C. and about 7 MPa, wherein the fluid is selected from the group consisting of: water, air, and oil.

18. The method of claim 11, wherein the mandrel comprises a polymeric material selected from the group consisting of: polyethylene, polypropylene, polyethylene terephthalate, nylon, and shape memory epoxy resin.

19. The method of claim 18, wherein the mandrel comprises a shape memory epoxy resin.

20. The method of claim 19, further comprising heating the mandrel to greater than or equal to about 150° C. and less than or equal to about 200° C. and removing the mandrel from the structural component after blow molding.

* * * * *